(12) United States Patent
Zhang et al.

(10) Patent No.: US 8,355,079 B2
(45) Date of Patent: Jan. 15, 2013

(54) TEMPORALLY CONSISTENT CAPTION DETECTION ON VIDEOS USING A 3D SPATIOTEMPORAL METHOD

(75) Inventors: Dong-Qing Zhang, Plainsboro, NJ (US); Sitaram Bhagavathy, Plainsboro, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 328 days.

(21) Appl. No.: 12/658,264

(22) Filed: Feb. 9, 2010

(65) Prior Publication Data

US 2010/0201871 A1    Aug. 12, 2010

Related U.S. Application Data

(60) Provisional application No. 61/207,260, filed on Feb. 10, 2009.

(51) Int. Cl.
*H04N 11/00* (2006.01)
*H04N 7/00* (2011.01)

(52) U.S. Cl. .......................... 348/465; 348/468; 382/176

(58) Field of Classification Search .................. 348/465, 348/468, 552–558, 571, 441–459, 607–624; 382/260, 298, 279, 176–180
See application file for complete search history.

(56) References Cited

U.S. PATENT DOCUMENTS

| | | | |
|---|---|---|---|
| 7,346,222 B2 * | 3/2008 | Lee et al. | 382/260 |
| 2005/0196043 A1 * | 9/2005 | Jung et al. | 382/176 |
| 2006/0203908 A1 * | 9/2006 | Chuang | 375/240.12 |

\* cited by examiner

*Primary Examiner* — Michael Lee
(74) *Attorney, Agent, or Firm* — Robert D. Shedd; Brian J. Cromarty

(57) ABSTRACT

A caption detection system wherein all detected caption boxes over time for one caption area are identical, thereby reducing temporal instability and inconsistency. This is achieved by grouping candidate pixels in the 3D spatiotemporal space and generating a 3D bounding box for one caption area. 2D bounding boxes are obtained by slicing the 3D bounding boxes, thereby reducing temporal instability as all 2D bounding boxes corresponding to a caption area are sliced from one 3D bounding box and are therefore identical over time.

16 Claims, 4 Drawing Sheets

TEMPORALLY CONSISTENT CAPTION DETECTION ON VIDEOS USING A 3D SPATIOTEMPORAL METHOD

CROSS REFERENCE TO RELATED APPLICATION

This application claims priority to and all benefits accruing from provisional application filed in the United States Patent and Trademark Office on Feb. 10, 2009 and assigned Ser. No. 61/207,260.

FIELD OF THE INVENTION

The invention relates to an apparatus and methods of processing video programs. Specifically, the invention relates to an apparatus and method for caption detection and processing in a video apparatus.

BACKGROUND OF THE INVENTION

The present invention generally relates to an apparatus and methods for processing video and specifically with the problem of caption detection in videos. FIG. 1 depicts captions, such as text or logos, which are superimposed on videos during the postproduction process which generally provide information related to the broadcaster or the video content being provided. Examples of captions include scores of sporting events, text related to the audio of the video program, logos of the broadcaster, or the like.

Detecting captions is useful for a variety of applications, for example, enhancing the perceived quality of small-sized videos for mobile devices by highlighting caption areas, or extracting metadata from text areas for video indexing and search. Caption detection is a key step of the systems for the above mentioned applications.

For applications such as caption highlighting to enhance video quality and metadata extraction, the stability and consistency of caption detection is very important, because if the detected caption boxes are not stable over time, the following video enhancement component could generate temporal artifacts, such as flickering on videos, due to inconsistent caption boxes for a caption area that stay on the screen for some time.

Previous methods performed caption detection in two steps implementing a smoothing approach as shown in FIG. 2. The first step extracts visual features, such as color, motion, or texture from images/videos and creates a binary map that identifies the pixels likely belonging to a caption area. The second step groups the identified pixels and generates the bounding boxes specifying the location and size of text areas. For the second step, these systems first generate 2D bounding boxes and then use a filtering process to smooth the detected 2D bounding boxes. However, this smoothing approach cannot completely get rid of the inconsistency of the caption detection results.

Another approach as depicted in FIG. 2 teaches a first step of extracting visual features, such as color, motion, or texture from images/videos and creates a binary map that identifies the pixels likely belonging to a caption area. A second step groups the identified pixels and generates the bounding boxes specifying the location and size of text areas. The detected bounding boxes are smoothed and stabilized over time under the assumption that captions usually stay on the screen for some time. To implement this second step, a temporal consistency check and smoothing is carried out to make the bounding boxes more temporally consistent. Although this approach alleviates the instability problem it does not necessarily completely eliminate the inconsistency of caption detection. As a result, temporal jittering of the detected bounding boxes is still a undesirable result.

It would be desirable to overcome the above listed problems and make the results of caption detection stable and consistent over time. The stability and consistency of caption detection over time is important for several related applications, such as video quality improvement, because unstable detection results could result in visible temporal artifacts, such as flickering or/and jittering.

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

SUMMARY OF THE INVENTION

In order to solve the problems described above; the present application according to the present invention teaches a caption detection system wherein all detected caption boxes over time for one caption area are identical, thereby reducing temporal instability and inconsistency. This is achieved by grouping candidate pixels in the 3D spatiotemporal space and generating a 3D bounding box for one caption area. 2D bounding boxes are obtained by slicing the 3D bounding boxes, thereby reducing temporal instability as all 2D bounding boxes corresponding to a caption area are sliced from one 3D bounding box and are therefore identical over time.

These and other aspects of the invention will be explained with reference to a preferred embodiment of the invention show in the accompanying drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE DRAWINGS

As described herein, the present invention provides video processing apparatus and methods for processing video and specifically for detecting, processing and extracting captions from a video stream. Such a video signal processor may include advanced features, including highlighting of areas comprising captions, visual enhancement of captions, enhancing the perceived quality of small sized videos for mobile devices, and extraction of data from captions to be used for video indexing and search purposes.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Figure 1:
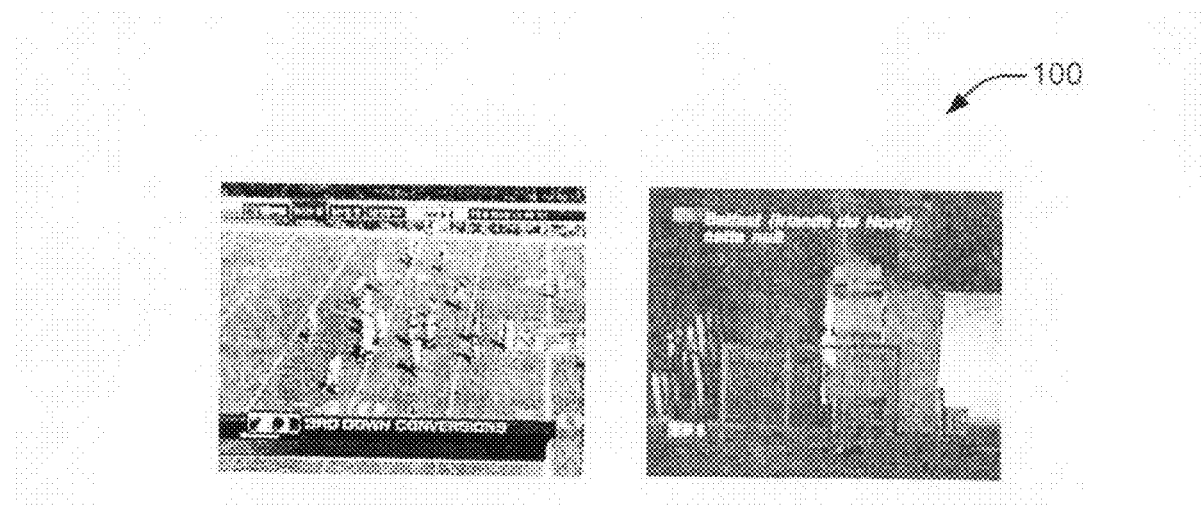
FIG. 1 depicts two exemplary representations of captions overlaid on video.
Figure 2:
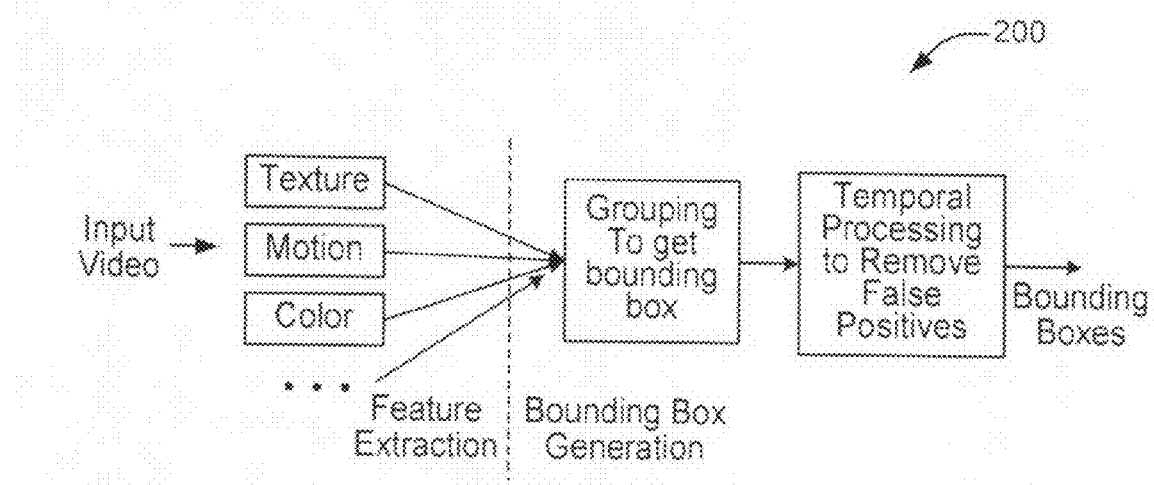
FIG. 2 is a block diagram of a caption detection apparatus according to the prior art.
Figure 3:
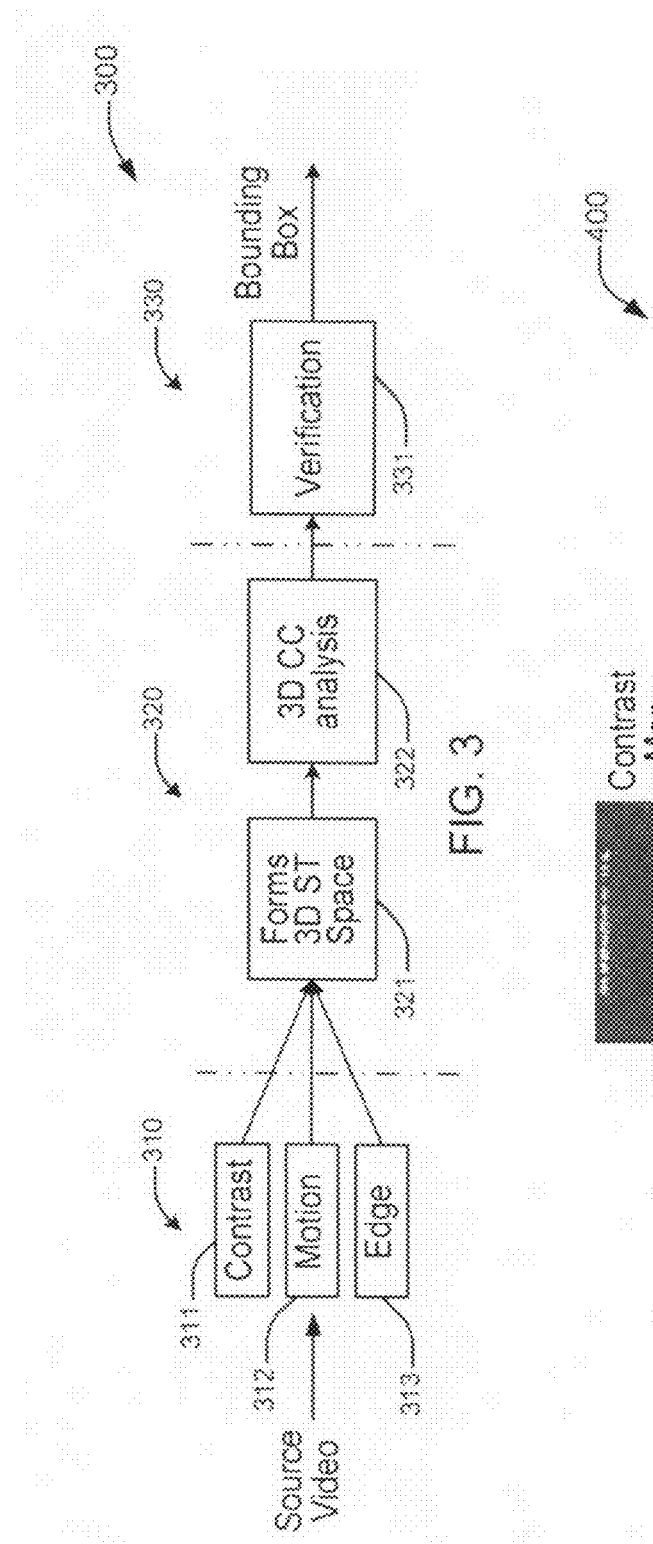
FIG. 3 is a block diagram of an exemplary embodiment of caption detection according to the present invention.

Turning to FIG. 3, a block diagram of an exemplary embodiment of caption detection according to the present invention is shown. The video signal process 300 of FIG. 3 comprises three stages: feature extraction and binary caption pixel map creation 310, bounding box generation 320, and verification 330.

The first stage, feature extraction and binary pixel map creation 310 is operative to process the source vide to generate an output of a 2D binary image that identifies the potential pixels belonging to caption areas. In an exemplary embodiment according to the present invention, the feature extraction part roughly includes three components: contrast map generation 311, edge map generation 312 and motion map generation 313. After feature extraction is completed, a binary caption pixel map is generated based on the combination (the "total confidence" map) of the feature maps. It should be noted that any type of features could be used in the feature extraction step, and any number of them could be combined to create the "total confidence" map.

The contrast map 311 is extracted by measuring the contrast in a local area (e.g. a N×M pixel block). To calculate the contrast map 311, the original image (gray scale) is first smoothed by a low-pass filter, and the smoothed image is subtracted from the original image. This operation tends to capture bright, high contrast areas of the image which should include text and logos. For dark text or logos, we can first negate the original image and apply the same operation again.

The edge map 312 is extracted by applying horizontal and vertical "sobel" filters (other similar filters can be also used). Sobel filter is a type of directional filter commonly used for edge detection. A weighted sum of the horizontal and vertical responses is calculated. One exemplary calculation may give a higher weight allocation to the vertical filter, based on the assumption that characters usually have more prominent vertical edges. The pixel values of the edge map are the weighted sums of the vertical and horizontal edge responses.

The motion map 313 is extracted by first calculating the difference between the current frame and the previous frame. Caption areas are usually static, therefore the pixels within a text area usually change more slowly than background pixels. This is especially true for some sports videos, e.g. hockey broadcasts. For each pixel, the temporal pixel difference is compared to a threshold. For example, if the difference is smaller than a certain value, it is set to 1, otherwise it is set to 0. These binary values for each pixel are accumulated over time until at a certain point when it is reset to 0 again because the temporal pixel difference becomes larger the threshold. The accumulation process allows the algorithm to aggregate pixel differences along multiple frames rather than just two frames. The pixel values of the motion map for a given frame are the accumulated values up to that frame rather than just the pixel differences of the previous and current frames. However, if the value of a pixel in the motion map exceeds a defined threshold, the value of the given pixel is set to the threshold value. This ensures the accumulated pixel values in the motion map would not overflow.

Figure 4:
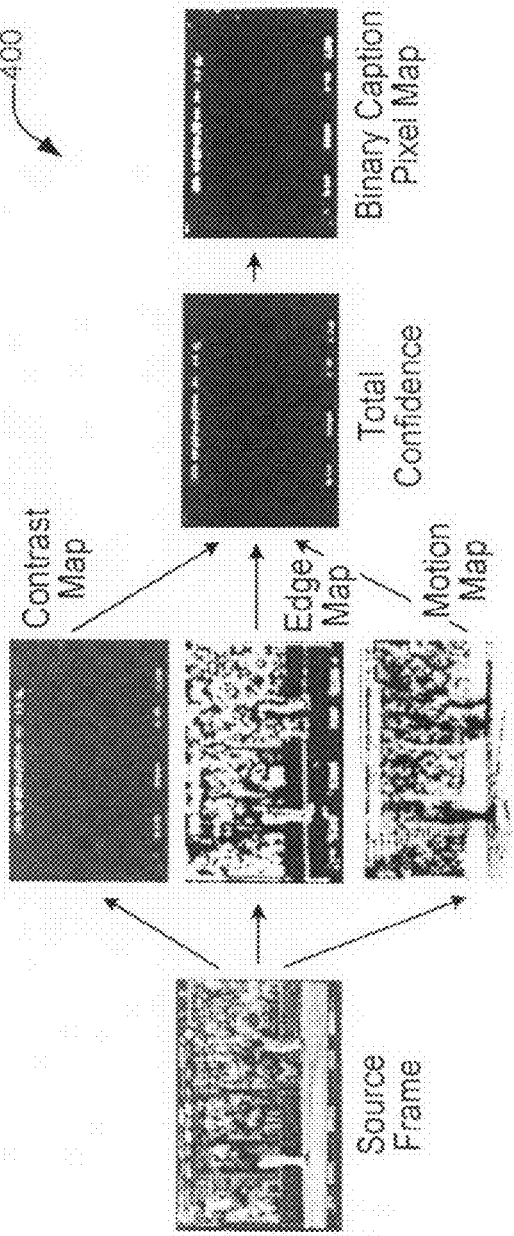
FIG. 4 is a visual representation of an exemplary embodiment of caption detection according to the present invention.

Turning to FIG. 4 a visual representation of an exemplary embodiment of the generation of the three feature maps, total confidence map, and binary caption pixel map according to the present invention is shown. After the three feature maps are generated, they are combined together by multiplication to obtain a "total confidence" map for each frame, which is a real-valued. The value of each pixel of this image indicates the likelihood of the pixel belonging to a text area. A thresholding process is then applied to convert the "total confidence" map into a binary caption pixel map where the white pixels in the binary image are potential caption pixels in the given frame.

Figure 5:
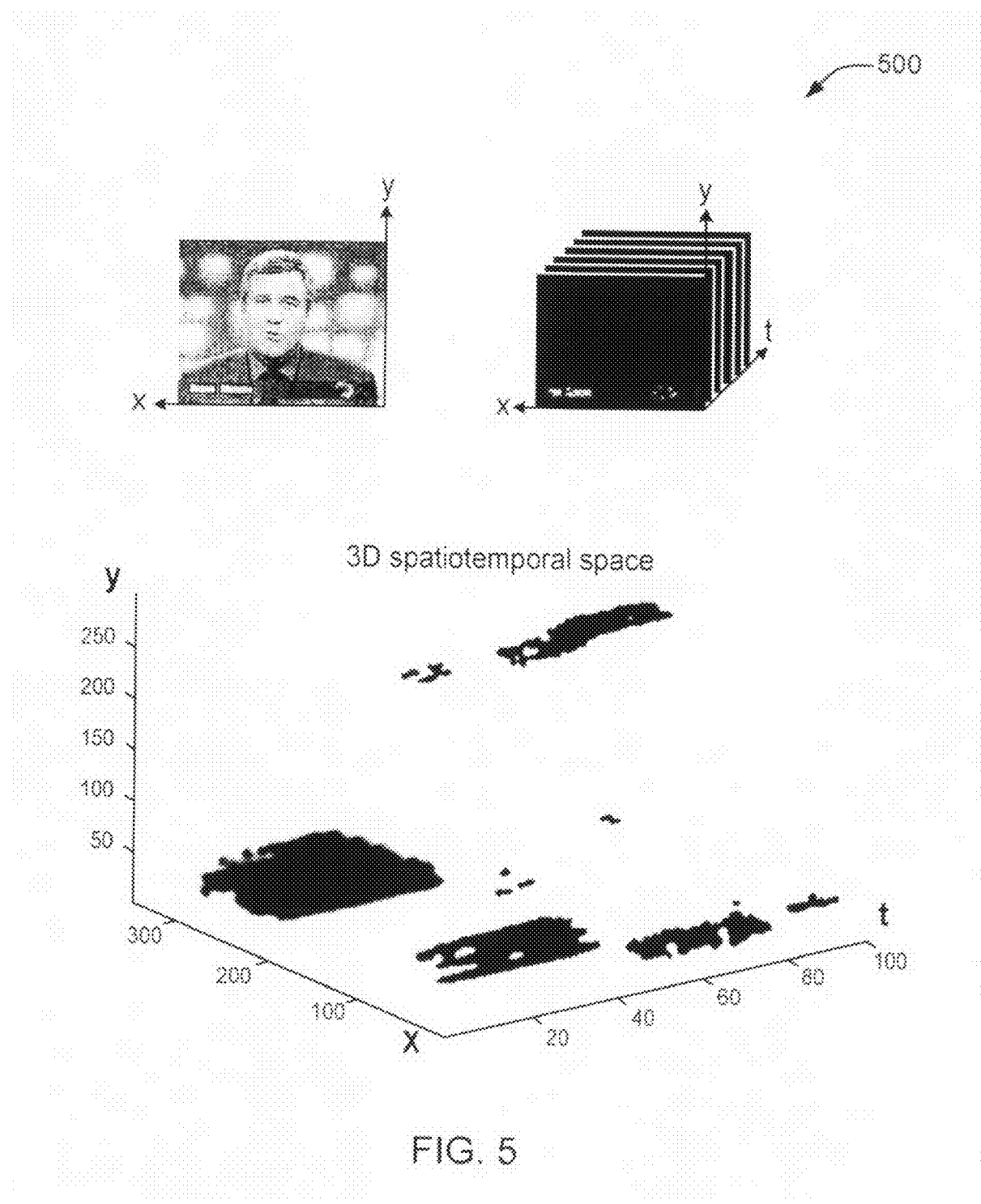
FIG. 5 is a visual representation of the generation of a 3D spatiotemporal space embodying aspects of the present invention.

After the binary caption pixel maps are generated for a number of frames, they are stacked up together to create a 3D spatiotemporal space 321 as graphically shown in FIG. 5. Each white pixel in the binary caption pixel map therefore becomes a point in the 3D spatiotemporal space. A connected component (CC) analysis in this 3D space can then be carried out to extract 3D blobs in the 3D space (FIG. 5 right). Ideally, each 3D blob corresponds to one text area. A 3D bounding box can be generated to encapsulate the 3D blob (see the red 3D cube in FIG. 5 right).

The main problem of the above mentioned offline 3D connected component (CC) analysis is that it can only be carried out after the complete 3D space is created. For a long video, this approach will require a large amount of memory space to save the binary caption pixel maps. It is therefore desirable to perform online 3D CC analysis 322 in a frame by frame manner, which can be described by an inductive algorithm as the following:

0. Initialization: create an empty 3D blob list.

1. For the $1^{st}$ frame, perform a 2D CC analysis to get 2D blobs. Put the 2D blobs into the 3D blob list.

2. For the i-th frame, i larger than 1, perform a 2D CC analysis in the i-th frame to get 2D blobs and check if any of these 2D blobs is connected to one or more 3D blobs in the 3D blob list. If a 2D blob is connected to one or more 3D blobs in the 3D blob list, the 2D blob will merge with its connected 3D blob(s) to form an updated 3D blob; the updated 3D blob is then added to the 3D blob list to replace the old 3D blob(s). Otherwise, a new 3D blob (initialized with just the 2D blob) is added to the 3D blob list.

3. After the update process for the i-th frame, all the 3D blobs in the list that are not updated are marked as "complete 3D blob". These 3D blobs doe not connect with any white pixel in the i-th frame, and therefore they also do not connect with any other pixels in the 3D space, so they are isolated as complete blobs. Once a "complete 3D blob" is isolated, a 3D bounding box that encapsulates the 3D blob will be calculated.

Various approaches to calculating the 3D bounding boxes can be used. One method is to calculate the outmost bounding box of the 3D blob, but the approach may be sensitive to noise. An improved exemplary method according to the present invention comprises the step of averaging the 3D blob over the time dimension to obtain a 2D blob. Each point of this 2D blob then has a real-valued number (confidence value) which is the average value over time. A thresholding process then is applied to remove the points with low confidence values. The outmost bounding box then is calculated based on this 2D blob. This 2D bounding box determines the beginning and ending point of the 3D bounding box in the X (horizontal)

and Y (vertical) dimension. The beginning and ending point of a 3D bounding box in the t dimension is the minimum and maximum frame ID of the points in the 3D blob. It should be noted that each point in the 3D blob is associated with a 3D coordinate (x,y,t), where t is the frame ID referred above, and x,y are the spatial coordinates.

In some rare cases, 3D blobs corresponding to two different text areas along time dimension may be touched in the 3D space at a certain time point. In this case, the two 3D blobs would be merged. Therefore, only one 3D bounding box is generated. If the sizes or positions of the two text areas are different, it will result in inaccurate bounding box calculation. There could be several solutions to this problem. Once solution is to use scene change detection, and make the 3D bounding box detection only happen in one scene. Usually when the text changes, the scene also changes. Therefore, this solution may avoid two 3D bounding boxes corresponding to different text over time merging together. Another solution is to detect the text change over time. This may be done after the 3D blob (with two or more different text in temporal dimension) is created. A swiping process along time dimension can be then carried out to detect if there's text content change. If the text content change happens, the 3D blob should be cut into two blobs, and 3D bounding boxes can be re-calculated. Text content here could be gray scale or color of the pixels.

After the 3D bounding boxes are generated, some of the 3D bounding boxes may be overlapping. To solve the overlapping problem, a procedure is carried out to first calculate the extent of overlapping between 3D bounding boxes. The extent of overlapping may be measured by overlapping ratio which is defined as O=overlapping_volume/min(volume of box A, volume of box B), where overlapping_volume is the volume of the intersection of bounding box A and bounding B. After all overlapping measures (in one embodiment, its overlapping ratio) are computed for every pair of 3D bounding boxes, a graph is created. Each node of this graph represents one 3D bounding box, and the edge represents if two bounding boxes are overlapping, i.e. if the overlapping ratio is larger than a certain threshold. Finally, a connected component analysis procedure is carried out in this graph to find out all isolated subgraphs (i.e. subgraphs disconnected from each other). All 3D blobs in the subgraphs will be merged together to form new 3D blobs. And new 3D bounding boxes will be calculated based on the updated 3D blobs.

It is desirable to reduce the number of false alarms resulting from the presence of noise and other irrelevant content. Verification 331 is a process to verify the caption boxes to remove false alarm boxes. Verification could be realized by different methods. One exemplary method according to the present invention is to extract features from the projection profile of the text area. This approach is mainly targeted at improving the precision of text caption detection.

First, before processing, a sequence of text boxes is obtained by cropping the frames using an extracted 3D bounding box. An average image is calculated by summing the pixels in the text boxes over the time dimension. This aims at blurring the background while keeping the foreground text image unchanged. This is because text area is usually static but background could be changing.

Figure 6:
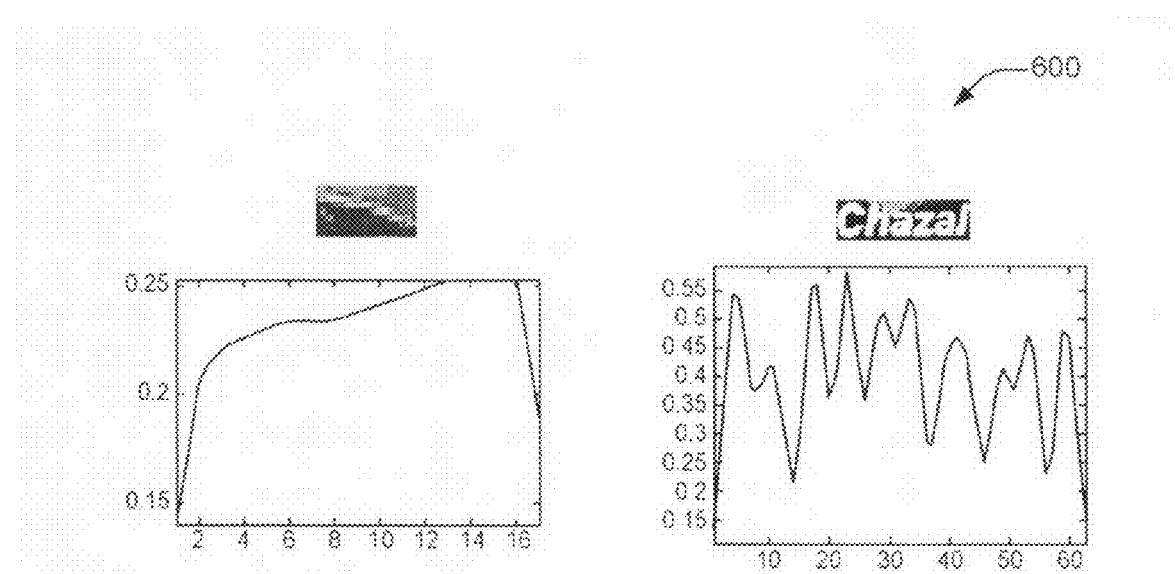
FIG. 6. Is a graphical representation of a verification process to reduce false alarms embodying aspects of the present invention.

Second, a vertical projection profile is calculated using the average image. The projection profile is the average of the image along the vertical dimension as depicted in FIG. 6, with each graph representing the graphical image shown above. Then local minima are found in the projection profile. The number of local minima would be taken as one feature. This feature is based on the observation that the projection profile of the text area usually has a wave-like pattern and has multiple local minima, whereas many false alarm regions have no local minima or has very few local minima (see FIG. 6). Another feature is vertical edge energy. It is based on the observation that usually text areas have very high vertical edge energy, whereas some of the false alarm areas only contain horizontal edges or have few vertical edges. Classification is done by thresholding these two features. Namely, if both of these features are larger than certain thresholds, the text area will pass the verification process; otherwise it is identified as a false alarm.

As a result of the previously described steps, a list of 3D bounding boxes is obtained. These 3D bounding boxes can be directly used for applications. However, if 2D bounding boxes are needed for individual frames in the video, the 3D bounding boxes can be sliced into 2D bounding boxes for individual frames.

Figure 7:
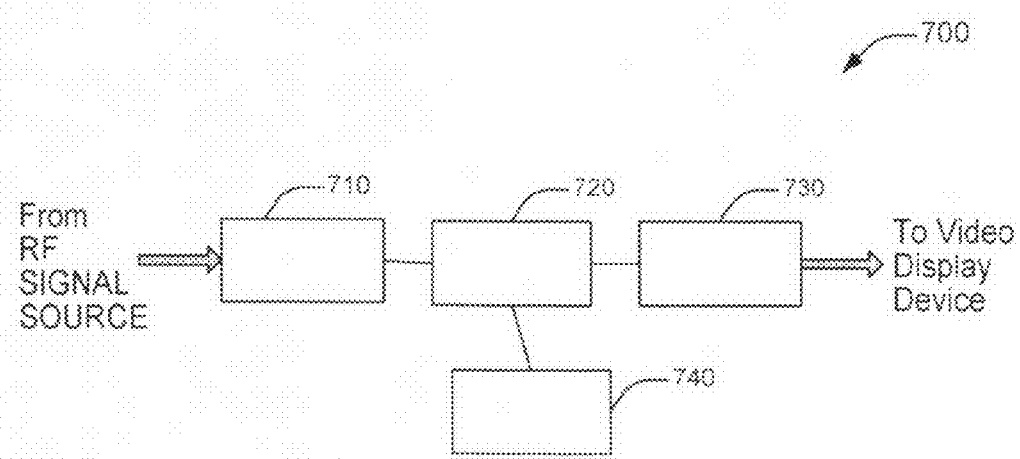
FIG. 7. Is a block diagram of a decoder embodying aspects of the present invention.

Turning to FIG. 7, a block diagram of a decoder 700 embodying aspects of the present invention is shown. The decoder receives a video signal comprising multiple image from an RF signal source. The video signal is coupled to a tuner 710 or demodulator for converting the video signal into a baseband video signal. The caption detector 720 comprises a processor for detecting a caption as described above. The results from this detection are stored in a memory 740 and/or coupled to a video processor 730. The video processes the video according to the results of the caption detection, for example, highlighting or enlarging the detected captions and then coupled this enhanced video signal to a video display device.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware.

What is claimed is:

1. An apparatus comprising:
   an input for receiving a video signal comprising a first image and a second image wherein said second image is received after said first image;
   a processor operative to determine a first probable location of a first caption within a first image, analyze said first image to identify a first region of said first image comprising said probable location of said first caption, determine a second probable location of a second caption with a second image, analyze said second image to identify a second region of said second image comprising said probable location of said second caption, determine a spatial overlap between said first region and said second region, and generate a data representing said spatial overlap;
   a memory for storing data concerning the probable locations of said first caption wherein said data is stored in said memory and updated with the determination results of said second image, the data representing a two dimensional analysis of the spatial overlap and a temporal representation of the spatial overlap; and
   an output for coupling said data to a video processor.

2. The apparatus of claim 1 wherein the data is overwritten with data concerning combined probable locations of said first caption and said second caption.

3. The apparatus of claim 1 wherein said data is coupled to a video processor when said temporal representation exceeds a threshold.

4. The apparatus of claim 3 wherein exceeding said threshold indicates a high probability of a time continuous caption being located in said spatial overlap.

5. The apparatus of claim 1 wherein said processor generates a plurality of spatial overlap representations, wherein each of said plurality of spatial overlaps is compared to a different threshold, and the combination of said comparisons is used to indicate a high probability of a time continuous caption being located in said spatial overlap.

6. The apparatus of claim 1 wherein said data is a bounding box representing said spatial overlap.

7. The apparatus of claim 1 wherein said each of said first region and said second region are represented as a bounding box and said data represents the spatial overlap of said bounding boxes.

8. A method for processing a video signal comprising the steps of:

receiving a first image in said video signal;

determining a first probable location of a first caption within a first image;

analyzing said first image to identify a first region of said first image comprising said probable location of said first caption;

receiving a second image in said video signal wherein said second image is received after said first image;

determining a second probable location of a second caption with a second image;

analyzing said second image to identify a second region of said second image comprising said probable location of said second caption determining a spatial overlap between said first region and said second region;

storing a data concerning the probable locations of said first caption;

updating said data with the determination results of said second image, said data representing a two dimensional analysis of the spatial overlap and a temporal representation of the spatial overlap; and generating a data representing said spatial overlap.

9. The method of claim 8 wherein said data is coupled to a video processor when said temporal representation exceeds a threshold.

10. The method of claim 9 wherein exceeding said threshold indicates a high probability of a time continuous caption being located in said spatial overlap.

11. The method of claim 8 wherein a plurality of spatial overlap representations are generated, wherein each of said plurality of spatial overlaps is compared to a different threshold, and the combination of said comparisons is used to indicate a high probability of a time continuous caption being located in said spatial overlap.

12. The method of claim 8 wherein said data is a bounding box representing said spatial overlap.

13. The method of claim 8 wherein said each of said first region and said second region are represented as a bounding box and said data represents the spatial overlap of said bounding boxes.

14. The method of claim 8 further comprising the step of verifying the content of said spatial overlap using a projection profile of a text block image and a plurality of features extracted based on the a local minima of a projection profile.

15. The method of claim 8 further comprising the step of verifying the content of said spatial overlap using a machine learning based classifier to classify a text block image as text image or non-text image.

16. The method of claim 8 wherein said spatial overlap is represented as a plurality of grey scale values, wherein each gray scale value indicates a probability of a pixel within said spatial overlap being a part of a time continuous caption within said spatial overlap.

* * * * *